Nov. 28, 1967   J. FREI   3,354,552
INSIDE MICROMETER
Filed May 10, 1965
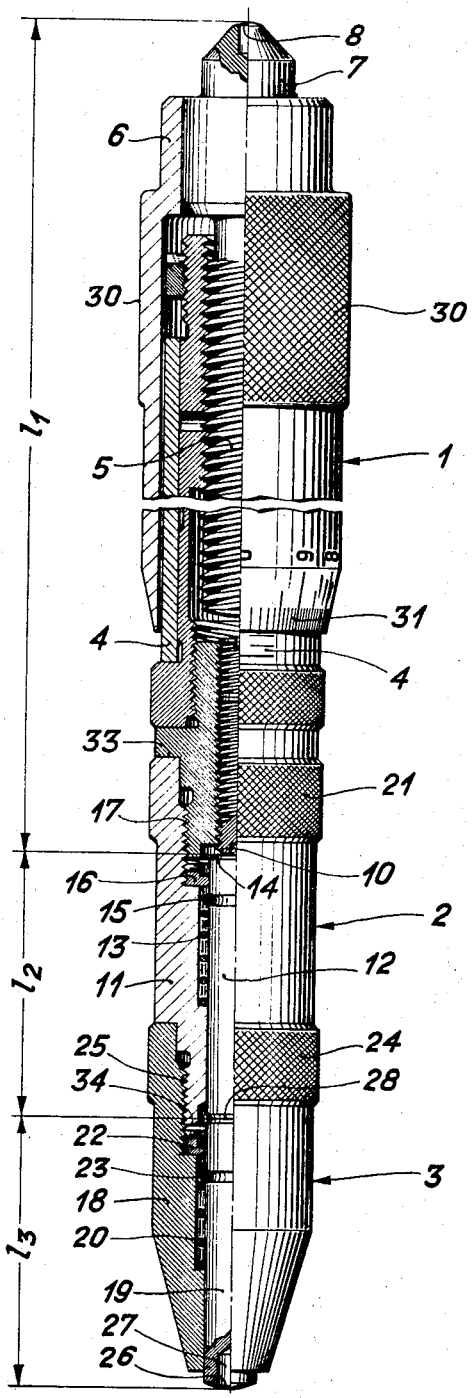
Inventor:
Josef Frei
BY
ATTORNEYS

United States Patent Office 3,354,552
Patented Nov. 28, 1967

3,354,552
INSIDE MICROMETER
Josef Frei, Wiesendangen, Zurich, Switzerland, assignor, by mesne assignments, to Tesa S.A., Vaud, Switzerland, a corporation of Switzerland
Filed May 10, 1965, Ser. No. 454,264
1 Claim. (Cl. 33—164)

The present invention relates to a rod gauge or inside micrometer comprising a micrometer head and a plurality of demountable extension rods.

Inside micrometers are those with which, by means of extensions of various suitable lengths assembled to the micrometer head, the length of the resulting micrometer "set" may be adjusted to the internal dimension of the object to be measured.

It is known in such micrometers to selectively mount the extensions to the micrometer head. The free end of the last extension so assembled is used as a measuring surface, placed in contact with the object to be measured. The surfaces placed in contact with the object to be measured are thus subjected to wear, so that after sufficient use a readjustment of the micrometer head is necessary in order to preserve accuracy of the readings. Since in these known micrometers every extension element may be used as the last one so as to come into contact with the object to be measured, adjustment must be made in respect of each extension piece upon readjustment of the micrometer, a time-consuming and costly process.

It is an object of the present invention to reduce the effort and expense involved in checking the extension pieces upon calibration or setup of an inside micrometer. This is achieved in accordance with the invention by making up the set of extension pieces or rods of at least one intermediate rod and one end rod, and by providing for each rod a resilient support (as regards axial motions) inside a protective sheath.

In this way there is obtained the result that upon readjustment of the set, it is only the length of the end rod which must be checked and it is only the end rod which may occasion readjustment of the micrometer head. This is true because it is only one end surface of this end rod which comes into contact with the work. Since the end surfaces of the intermediate rods are not subjected to wear, the manufacturing cost thereof can be reduced. They do not have to be made of hard metal alloy, e.g. of a carbide or similar material, but can be made in general of other metals, suitably hardened.

According to another feature of the invention each extension rod, including the "end" one intended to bear against the workpiece being measured, is resiliently supported in a protective sheath. The sheath of each extension and its rod per se are so dimensioned that, when the extension is disassembled from the micrometer head, either directly or through extensions between it and the head, both ends of the rod per se lie retracted within the sheath and are there protected from wear or abrasion. When extension rods (including the "end" rod) are added to the micrometer head, it is these sheaths which are coupled together by screw-threaded connections, and upon such assembly the extension rod per se within each sheath is pressed by this resilient support with a specified force against the adjacent extension rod per se. The construction is moreover such that in each of the intermediate extensions the end of the rod per se far from the micrometer head (i.e. the "free" end of the rod) lies retracted within the sheath of that rod even when these intermediate extensions are assembled to the head. This last feature prevents, or at least discourages, any attempt to use the set without the "end" extension rod, so that the free end of the other extension rods will not be brought inadvertently into contact with the workpiece. On the other hand, the sheath and rod per se of the end extension are so proportioned that when this end extension is assembled to the head, either directly or through one or more intermediate extensions, the end of the rod per se of this end extension will project beyond its sheath, so as to be available for engagement with the workpiece to be measured.

Advantageously, the rods of the intermediate extensions may be made of hardened metal whereas the rod of the "end" extension, or at least the surface thereof engaging the workpiece, may be of especially hard alloy such as a carbide.

The invention will now be further described in terms of a non-limitative example and with reference to the accompanying drawings, wherein the single figure shows, partly in elevation and partly in axial section, an inside micrometer in accordance with the invention.

In the micrometer shown in the drawing, a micrometer head generally indicated at 1 having a knurled surface 30 has affixed thereto an intermediate extension generally indicated at 2, and an end extension generally indicated at 3 affixed to the latter. Of course, as many intermediate extensions can be employed as desired for the dimension to be measured.

The micrometer head 1 comprises in known fashion a measuring sheath 4 or female element carrying on parts adjustably fixed thereto the female thread of the micrometer head. It also comprises a thimble or drum 6, affixed to the micrometer spindle 5 which carries the male thread. The drum 6 and spindle 5 constitute the male element of the micrometer head. The spindle carries at one end a measuring pin 7, the measuring surface 8 of which is to come in contact with the workpiece to be measured. A clamp, not shown, may be provided for locking the drum 6 with respect to the sheath 4.

The micrometer head possesses at the end opposite the pin 7 a carefully finished and preferably lapped gauging surface 10 which is axially fixed with respect to the sheath 4. The distance between the measuring gauging surface 8 and the surface 10 is indicated in the drawing as $l_1$. This length may be adjusted by rotating the drum 6 and spindle 5 with respect to the sheath 4, and can be read off at a scale on the sheath and a scale, shown at 31, on the drum.

The intermediate extension 2 comprises a protective sheath 11 and a rod 12 of accurately known length between its end surfaces 14 and 28, this length being indicated as $l_2$. The sheath 11 is provided with a first counterbore accommodating a helical spring 13 and with a second counterbore having a female thread as indicated at 17. The rod 12 is retained in the sheath 11 even upon disassembly of the extension from the micrometer head, by means of a ring 15 snapped into a groove of the rod 12 and fitting in the first counterbore, and by means of a washer 16 having a male thread which is threaded down to the bottom of the second counterbore.

When the extension 2 is assembled to the head 1 by engagement of the female thread at its second counterbore with a corresponding male thread on the head 1 so that the upper end of the sheath 11 (as shown in the drawing) brings up against an abutment on the head as shown at 33, the ring 15 will be disengaged from the washer 16 and the rod 12 will be pressed at its surface 14 against the gauging surface 10 of the micrometer head with a specified force determined by the compression undergone by the spring 13.

The intermediate extension 2 includes, in addition to the parts mentioned, a knurled gripping surface 21 and, in particular, at the end thereof opposite the counterbores mentioned, a reduced section carrying a male thread as indicated at 25.

The end extension, generally indicated at 3, comprises a protective sheath 18 similar to the sheath 11 except for the absence of any male thread thereon, and an end rod 19 which is supported within the sheath 18 by means of a spring 20, snap ring 23 and threaded washer 22 which are respectively similar to the elements 13, 15 and 16 of the intermediate extension 2.

Both of the extensions 2 and 3 are so proportioned as regards the sheath and rod elements thereof and as regards the positioning of the snap rings 15 and 23, and threaded washers 16 and 22, that when these extensions are disassembled from the micrometer head the measuring rods per se, elements 12 and 19 of those extensions, will be retracted at both ends inside the limits of their respective sheaths. Moreover, in the case of the intermediate extensions such as 2, the dimensioning is such that the end surface of the rod remote from the head 1, shown at 28 for the extension 2, remains retracted within the sheath even upon assembly of such intermediate extensions to the micrometer head. This is indicated in the drawing where the end of the sheath 11 far from the micrometer head, as indicated at 34, occupies a position farther from the micrometer head than the lower end surface 28 of the rod 12. The addition to the length of the micrometer set made by the intermediate extension 2 is the length $l_2$ of the rod 12 between its end surfaces 14 and 28, and this length $l_2$ is seen to lie at both ends thereof inside the extreme limits 33 and 34 of the sheath 11. As already stated, this condition obtains both when the extension 2 is assembled to the micrometer head and when it is disassembled therefrom.

In the case of the end extension 3, the sheath 18 and rod 19 are so proportioned together with the positioning of the snap ring 23 and threaded washer 22 that, when the end extension is disassembled from the set, the measuring surface 26 at the far end of the rod 19 lies retracted within the sheath, as does also the upper end of that rod at 28. The length of the rod 19 between these surfaces is indicated in the drawings at $l_3$. The arrangement is such however as regards the displacement of the rod 19 from the rest position in which ring 23 and washer 22 engage each other, which disengagement is effected by the rod 12 of the intermediate extension when assembled to the micrometer head, and when the sheath 18 is drawn down at the threads 25 onto the intermediate sheath 11, that the end surface 26 of the rod 19 will then protrude beyond the end of the sheath 18.

It is of course possible to assemble the end extension 3 directly to the micrometer head 1.

The measuring surface 26 of the end rod 19 which is to be brought into contact with the workpiece is preferably made of hardened metal or hard metal alloy. In order to avoid making the whole of the rod 19 of such material the measuring surface 26 is provided on an insert 27, so that the rod as a whole need not be made of especially hardened material.

In the apparatus thus far described, the rod 12 of the intermediate extension 2 does not come into contact with the workpiece since with the intermediate extension 2 assembled to the micrometer head, the end surface 28 of the rod 12 is retracted from within the free end 34 of the sheath 11. Hence no inadvertent engagement of this end surface 28 with the workpiece can occur. The surface 28 is therefore protected from wear. The length $l_2$ of the rod 12 consequently does not need to be checked upon a recalibration or adjustment of the micrometer set.

Since the anvil end surfaces of the rods of the intermediate extensions are not subjected to wear, they need not be made of expensively hardened material, and may be made of material of only moderate hardness. Upon an adjustment or recalibration, it is only necessary to subject the length $l_3$ of the final rod 19 to a check. Such a check is much simpler and less expensive than that which has been necessary in micrometers of the prior art wherein all of the extensions of the set had to be rechecked.

The rods of the intermediate extensions and that of the end extension are shown as having a cylindrical cross-section. They may however have any other desired cross-section. The adjacent end surfaces of the rods may be plane or of some other shape such as conical.

While the invention has been described herein in terms of a presently preferred embodiment thereof, the invention is not limited thereto, but comprises all modifications on and departures therefrom falling within the spirit and scope of the appended claim.

I claim:

An inside micrometer comprising a measuring head member, at least one intermediate extension member, and an end extension member, the head member including two elements controllably movable relatively to each other, at least one of said elements having a gauging surface thereon, each of said extension members including a rod, a protective sheath surrounding and longer than the rod, and resilient means coupling the rod and sheath together to stress the rod and sheath toward a relative position in which both ends of the rod are intermediate the ends of the sheath, said micrometer further comprising first two-part coupling means having one part on said one element and the other part on the sheath of the intermediate member to couple one end of the sheath of the intermediate member to said one element with the rod of the intermediate member engaging said gauging surface and with the other end of the sheath of the intermediate member projecting beyond the rod of that intermediate member in all positions of said micrometer in which said intermediate member is assembled to said head member, and second two-part coupling means having one part on the sheath of the intermediate member and the other part on the sheath of the end member to couple one end of the sheath of the end member to the other end of the sheath of the intermediate member with the rod of the end member engaging the rod of the intermediate member and with the rod of the end member projecting beyond the other end of the sheath of the end member, the other part of said second two-part coupling means being also engageable with said one part of said first two-part coupling means to couple said one end of the sheath of the end member to said one element with the rod of the end member engaging said gauging surface and with the rod of the end member projecting beyond the sheath thereof.

References Cited

UNITED STATES PATENTS

| | | | |
|---|---|---|---|
| 1,559,801 | 11/1925 | Steinle | 33—164 |
| 1,890,827 | 12/1932 | Pratt | 33—147 |
| 2,193,939 | 3/1940 | Sanford | 33—164 |
| 2,199,236 | 4/1940 | Bigwood | 33—167 |
| 2,376,118 | 5/1945 | Brown | 33—125 |
| 2,847,764 | 8/1958 | Schaerer | 33—164 |

LEONARD FORMAN, *Primary Examiner.*

W. D. MARTIN, *Assistant Examiner.*